(No Model.)
J. F. BLAKE.
APPARATUS FOR EXHIBITING ILLUSIONS.
No. 273,445. Patented Mar. 6, 1883.
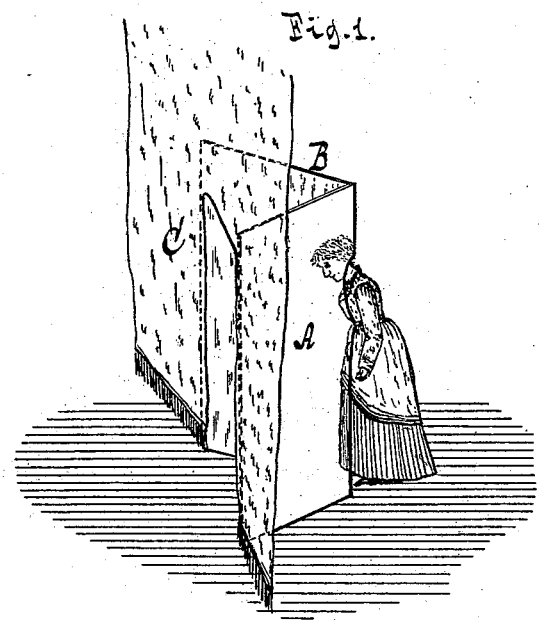
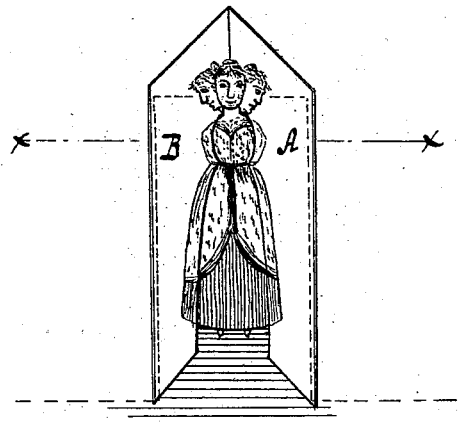
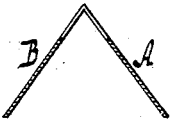
WITNESSES:
Otto Hafeland
William Miller
INVENTOR
John Feggetter Blake
BY Van Santvoord & Hauff
ATTORNEYS

United States Patent Office.

JOHN F. BLAKE, OF NEW YORK, N. Y.

APPARATUS FOR EXHIBITING ILLUSIONS.

SPECIFICATION forming part of Letters Patent No. 273,445, dated March 6, 1883.

Application filed December 27, 1882. (No model.)

*To all whom it may concern:*

Be it known that I, JOHN FEGGETTER BLAKE, a citizen of the United States, residing at New York, in the county and State of New York, have invented new and useful Improvements in Apparatus for Exhibiting Illusions, of which the following is a specification.

This invention consists in the combination of two mirrors, which are placed together at an angle of from sixty to ninety degrees and provided at their inner edge with an opening large enough to admit the head of a person and to exhibit a portion of the body.

In the accompanying drawings, Figure 1 represents a perspective view of my apparatus. Fig. 2 is a front view. Fig. 3 is a horizontal section in the plane *x x*, Fig. 2.

Similar letters indicate corresponding parts.

In the drawings, the letters A B designate two mirrors, which are placed together at an angle of from sixty to ninety degrees. If the apparatus is to be used by grown persons, the mirrors must be about six feet high and three feet wide each. The inner edge of each mirror is cut away to such an extent that when the two mirrors are placed together an opening is left large enough to admit the head of a person and to exhibit a portion of the body, as shown in Fig. 2. The front and top edges of the two mirrors are concealed by a curtain, C, or by any other means. If a female person, for instance, stands close to the corner formed by the two mirrors and she passes her head through the opening made for this purpose, a three-headed woman is exhibited to the spectators in front, each mirror showing the reflection of the natural head, while that portion of the body which projects through the opening in the inner edges of the two mirrors is also reflected by both mirrors, so as to show a full body to the spectators.

Of course my apparatus may be used for exhibiting various illusions of a different nature from that above described; but the example given is sufficient to explain the nature of my invention, and to show that very amusing effects may be produced by the same.

I am aware that mirrors have been used for producing optical illusions, said mirrors having their backs placed at an angle of about ninety degrees, while their reflecting-surfaces form an angle of two hundred and seventy degrees of arc, or thereabout, an aperture being formed at the angle for exhibiting parts of the human figure. This invention I do not claim.

What I claim as new, and desire to secure by Letters Patent, is—

An apparatus for producing optical illusions, consisting of two mirrors having their reflecting-surfaces forming an angle with each other of from sixty degrees to ninety degrees, said mirrors being cut away at their point of intersection to form an opening large enough to admit the head of a person or other object and to exhibit a portion of the body, substantially as described.

In testimony whereof I have hereunto set my hand and seal in the presence of two subscribing witnesses.

JOHN FEGGETTER BLAKE.

Witnesses:
W. HAUFF,
E. F. KASTENHUBER.